(12) United States Patent
Sawada et al.

(10) Patent No.: US 6,351,278 B1
(45) Date of Patent: Feb. 26, 2002

(54) CIRCUIT FOR CONTROLLING CURRENT FOR DRIVING PRINTING DOT ARRAY

(75) Inventors: Hideki Sawada; Hiromi Ogata, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1222 days.

(21) Appl. No.: 08/576,915

(22) Filed: Dec. 22, 1995

Related U.S. Application Data

(63) Continuation of application No. 08/025,569, filed on Mar. 3, 1993, now abandoned.

(30) Foreign Application Priority Data

Mar. 5, 1992 (JP) ............................................... 4-048884

(51) Int. Cl.[7] ............................. B41J 2/435; B41J 2/45
(52) U.S. Cl. ..................... 347/237; 347/240; 358/298
(58) Field of Search .......................... 347/240, 183, 347/188, 131, 15, 143, 237, 211, 132

(56) References Cited

U.S. PATENT DOCUMENTS

| 4,074,320 | A | * | 2/1978 | Kapes, Jr. ................ 358/302 X |
| 4,885,597 | A | * | 12/1989 | Tschang et al. .............. 347/237 |
| 5,025,322 | A | * | 6/1991 | Ng .............................. 358/298 |
| 5,062,002 | A | * | 10/1991 | Dahlquist et al. ........... 358/298 |
| 5,138,310 | A | * | 8/1992 | Hirane et al. ........... 347/237 X |
| 5,264,868 | A | * | 11/1993 | Hadley et al. .............. 347/237 |
| 5,309,151 | A | * | 5/1994 | Aoki ..................... 347/237 X |

FOREIGN PATENT DOCUMENTS

JP          1-160659    *   6/1989    .................. 346/150

* cited by examiner

*Primary Examiner*—David F. Yockey
(74) *Attorney, Agent, or Firm*—Fish and Richardson P.C.

(57) ABSTRACT

A current control circuit including at least one bit corrector for performing full-scale activation or deactivation of a voltage to gate terminals of output units according n-bit correction data, and at least one digital to analog converter for adjusting a voltage to be applied between drain and source terminals of transistors of the output units. This circuit is used for the bit correction and gradation control.

8 Claims, 5 Drawing Sheets

CIRCUIT FOR CONTROLLING CURRENT FOR DRIVING PRINTING DOT ARRAY

This application is a continuation of U.S. application Ser. No. 08/025,569, filed Mar. 3, 1993, now abandoned.

BACKGROUND OF THE INVENTION

1. Field of the Invention

This invention relates to a circuit for controlling a current which is used to drive loads such as light emitting diodes (LED), and more particularly to a circuit for driving LEDs of an LED print head or a thermal head in a printer such as a color printer, a color plotter, or a digital PPC.

2. Description of the Related Art

LED print heads with gradation correcting function are well-known at present. The LED print head comprises LED chip arrays and LED chip driving ICs on a one-to-one ratio or on a one-to-two ratio. The LED chip driving IC controls a current for the LED print head to print one dot (called "one bit" hereinafter), thereby controlling and correcting the gradation. For this purpose, the LED driving IC adjusts a voltage at a gate of a transistor which determines the current value of the LED, so that bit correction and gradation control can be performed in the print data.

In other words, the bit correcting data and the gradation controlling data are combined into a group of data by an additional circuit, which is converted into an analog voltage signal by a digital to analog converter, and is then applied to gate terminals of the transistors so as to perform the bit correction and gradation control.

The bit correcting data are used for correcting a current for each dot. Specifically, the data is for fine adjustment of the driving current so that the LED assures printing with a constant density when the same current is applied to all the LEDs. The gradation controlling data are for determining the print density for each dot. The bit correcting data are preliminarily stored in a memory such as a ROM, are then combined with the gradation data to be transmitted for each line, and supplied to the LED driving IC as a group of data.

As described so far, with the conventional LED driving IC, the bit correcting data and the gradation control data are combined beforehand, and are converted into the analog voltage signal by the digital to analog converter. The gate voltage of the transistor is controlled based on the combined data so as to control the LED driving current. For this purpose, an additional circuit is required, which would undesirably make ICs expensive.

SUMMARY OF THE INVENTION

It is therefore an object of this invention to provide an LED driving IC which receives bit correcting data and gradation correcting data independently so as to perform bit correction and gradation control without use of an additional circuit therefore.

According to a first aspect of the invention, there is provided a current control circuit for controlling a current for driving printing dot arrays of a print head, comprising: at least one output unit whose output current is adjusted to between $2^0$ and $2^{n-1}$ times a reference current and which includes "n" output transistors, to a gate terminal of which different voltages are independently applied; at least one bit corrector for correcting bits of print data by performing full-scale control of a voltage applied to gate terminals of the output transistors according to stored correction data; and at least one gradation controller for controlling according to m-bit gradation data a voltage applied to drain and source terminals of the output transistors to a voltage of between $2^0$ and $2^{n-1}$ times a reference voltage in a range of the output transistors.

With this arrangement, the current for driving printing dot arrays of a print head is controlled by using the range of the output characteristics of the output transistors. The digital to analog converter of the gradation control circuit is designed to apply an analog voltage of $2^m$ gradation to the drain and source terminals of n output transistors. Therefore, the print data can be subject to the gradation control substantially in proportion to the analog output from the digital to analog converter as specified by the gradation data. Furthermore, bit correction can be performed by applying an output voltage to gate terminals of the output transistors from the bit correction circuit and by carrying out full-scale control of the voltage applied the output transistors. Thus, bit correction can be performed according to the correction data without use of a special synthesizing circuit.

The bit corrector comprises n-bit shift registers, and activation and deactivation of the output registers is determined according to values stored in the shift registers.

The gradation control comprises m-bit shift registers, and each of the m-bit D/A converters converts m-bit data to an analog output.

A voltage between a source terminal and a drain terminal of the output transistor is controlled by the output of the digital to analog converters.

The output units, correctors and gradation controllers are provided in equal plural numbers. The correctors are connected in series so as to serially receive predetermined correction data.

According to a second aspect of the invention, there is provided a printer with an LED print head, comprising: at least one output unit whose output voltage is adjusted to $2^0$ to $2^{n-1}$ times a reference current and which includes n output transistors, to a gate terminal of which different voltages are independently applied; at least one bit corrector for correcting bits of print data by performing full-scale control of a voltage applied to gate terminals of the output transistors according to stored correction data; at least one gradation controller for controlling according to m-bit gradation data a voltage applied to a drain terminal and a source terminal of the output transistors to a voltage of $2^0$ to $2^{n-1}$ times a reference voltage in a range of the output transistors by using m-bit gradation data; and at least one LED array including a plurality of LEDs to receive current from a plurality of output units, and emit light.

DESCRIPTION OF PREFERRED EMBODIMENT

Figure 1:
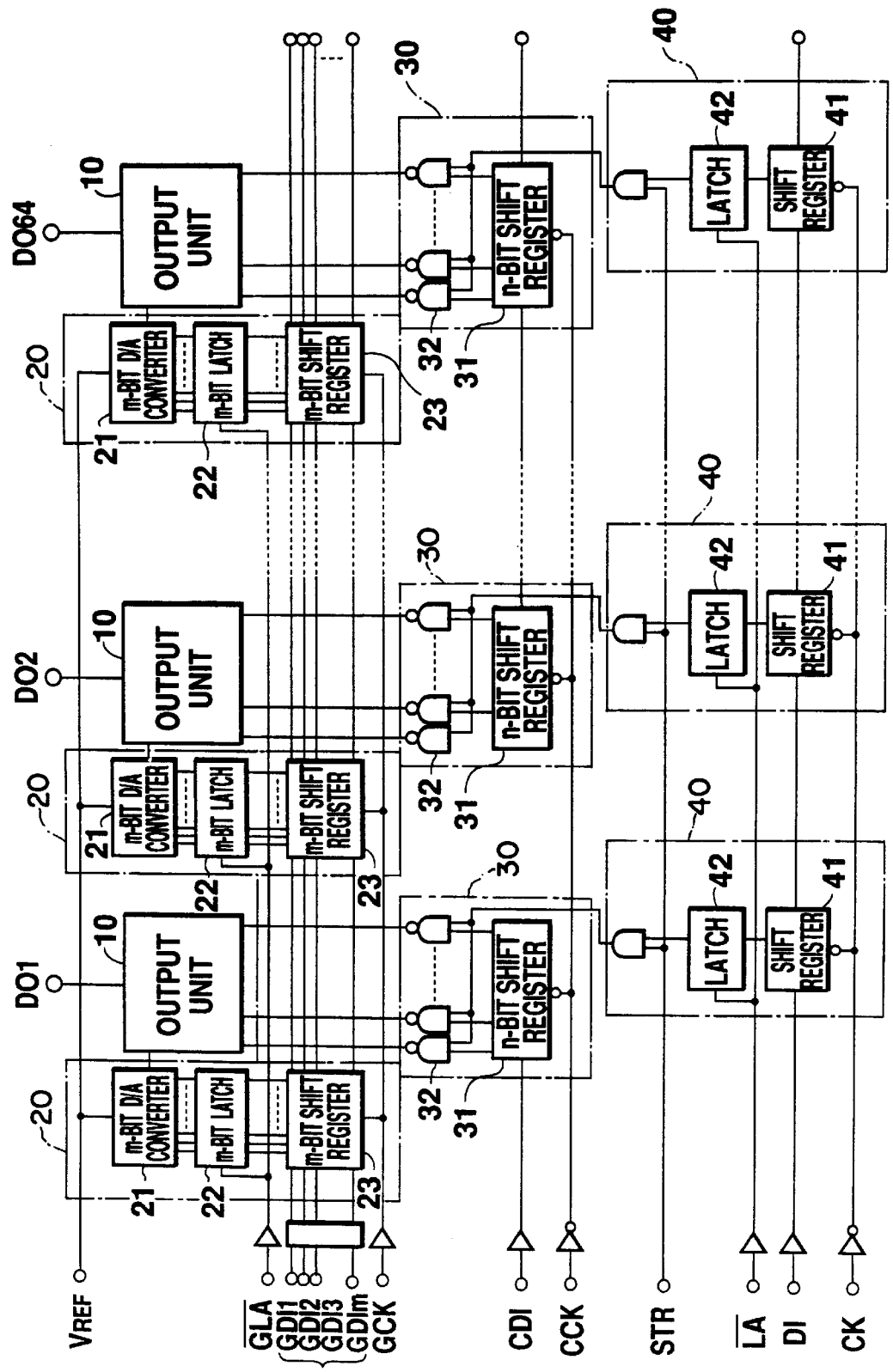
FIG. 1 is a block diagram showing the overall configuration of an LED driving IC.

The invention will be described with reference to a preferred embodiment shown in the drawings.

Referring to FIG. 1, an LED driving IC comprises output units 10, gradation controllers 20, bit correctors 30, and an output controller 40. Each output unit 10 includes "n" output transistors. Sixty-four (64) output units 10 serve for 64 LED chips, and supply a driving current to them. Sixty-four (64) gradation controllers 20 are provided for 64 output units 10. Each gradation controller 20 controls the driving current to be supplied to each LED by the output unit 10, and performs the $2^m$ gradation control for each LED chip. The bit corrector 30 has n-bit correction data for each output unit 10, and turns on or off the corresponding output transistors according to the bit correction data so as to perform bit-control of the current to be supplied to the LEDs. The output controller 40 provides printing data to the output units 10 via the bit correctors 30, thereby determining which output unit 10 should supply the current to the LED.

Figure 2:
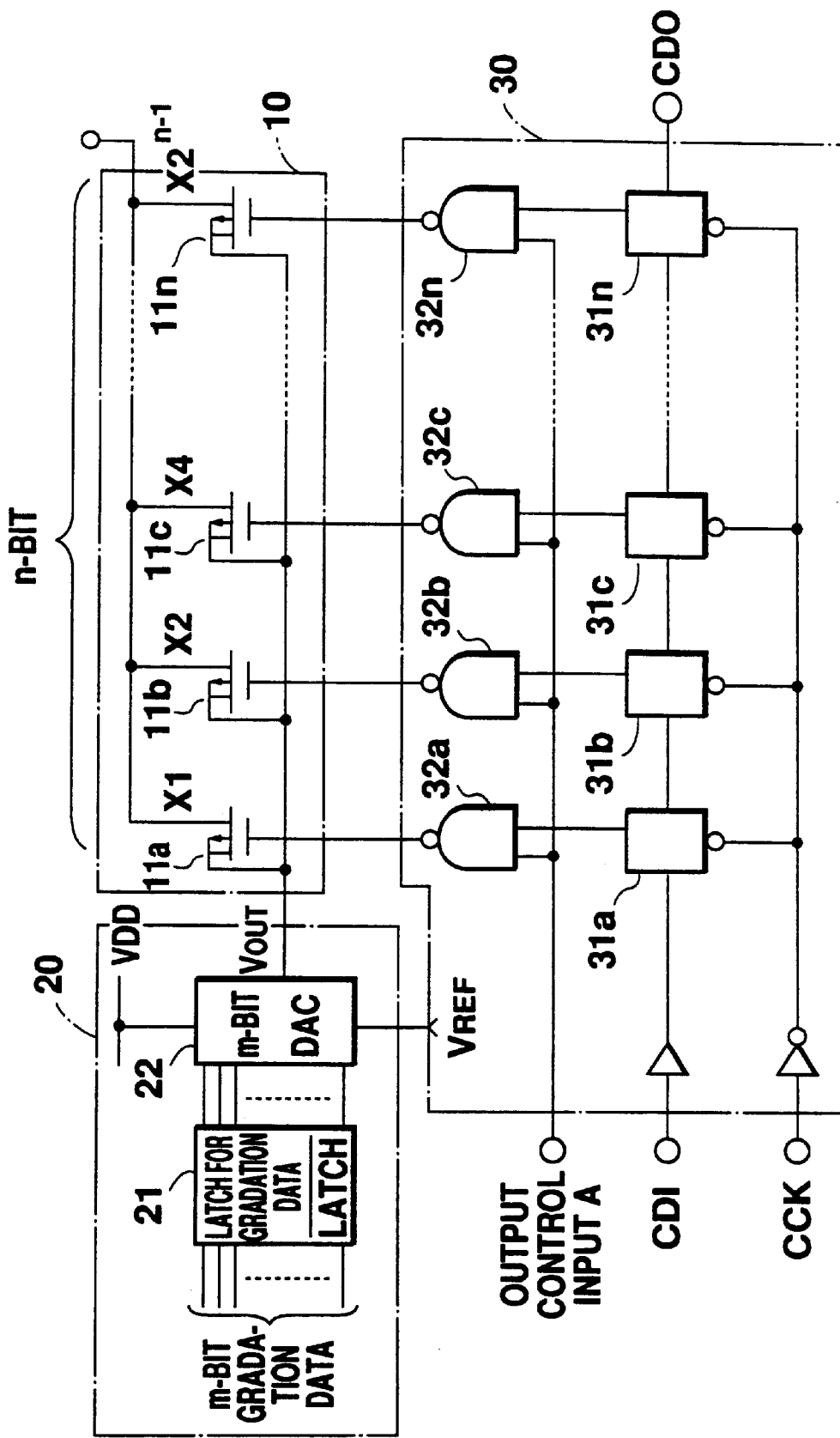
FIG. 2 is a diagram of a logic circuit, showing the configuration of a bit corrector of the LED driving IC.
Figure 3:
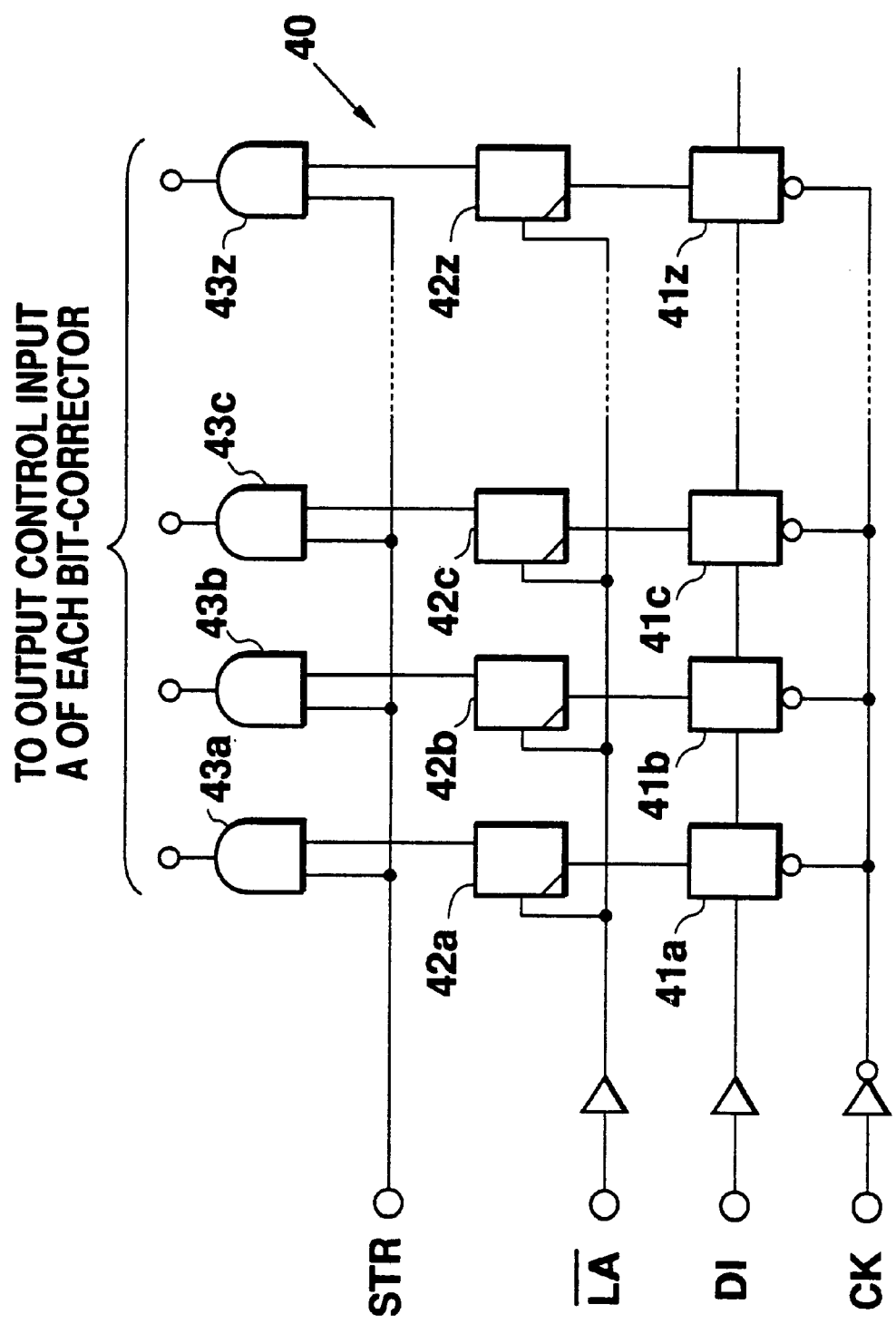
FIG. 3 is a diagram of a logic circuit, showing the configuration of an output controller of the LED driving IC.

FIGS. 2 and 3 show the detailed circuit configuration of the LED driving IC of FIG. 1 according to the invention.

As shown in FIG. 2, each output unit 10 includes "n" transistors 1a–11n. These transistors 11a–11n are designed to have an output current which is $2^0$ to $2^{n-1}$ times a reference current when the same voltage is applied between drain and source terminals of the transistor in a linear region of the output characteristics. Furthermore, different voltages are applied to gate terminals of respective transistors. Since the output transistors 11a–11n are separately turned on or off, the current which is supplied to the LED chips from the output unit 10 can be adjusted to be any value of current which is 1 to $2^{n-1}$ times the reference current.

Each gradation controller 20 comprises a data latch 21 and a digital to analog converter 22. The gradation controller 20 provides the received m-bit gradation data to the digital to analog converter 22 via the data latch 21. The digital to analog converter 22 converts the m-bit gradation data into a corresponding analog voltage. The voltage to be applied between the drain and source terminals of all of the n transistors (FET) in the output unit 10 is controlled by the converted analog voltage. Specifically, the value of current to be output from the output unit 10 is controlled in $2^m$ steps, thereby performing $2^m$ gradation control of luminous intensity of the LEDs. In this embodiment, the output is supplied to source terminals of the output transistors 11 from the digital to analog converter 22, thereby controlling the voltage between the drain and source terminals of the transistors.

FIG. 2 also shows the configuration of the bit corrector 30 which performs the bit correction by using the correction data. The bit corrector 30 comprises NAND gates 32a to 32n, and shift registers 31. Each shift register 31 includes "n" flip-flops 31a–32n. According to the printing data received at an output control input A, the NAND gates 32a–32n determine which output of the output unit 10 should be turned on or off. In the shift register 31, the flip-flops 31a–31n store the n-bit correction data. Here, the shift register 31 shifts the data by using a clock cck. For this purpose, the shift register 31 stores successively transferred n-bit correction data CDI for each output unit 10. In other words, the data are transferred until serial data for the 64 output units 10 are passed to the shift register 31, and the data for the shift register 31 are stored. Thus, all the shift registers 31 hold the correction data for the corresponding output units 10. The bit correction is carried out by applying the contents stored in the shift register 31 to the output transistors 11a to 11n of the output unit 10 via the NAND gates 32a–32n. In other words, since the output transistors 11a–11n have different output characteristics, the n-bit correction data are stored in the shift register 31. The output transistors 11a to 11n are turned on or off according to the n-bit correction data so as to control the amount of light emission of the LEDs connected to the output unit 10. As soon as the power source is turned on, the bit correction data are serially transferred to and stored in all of the shift registers 31 of the bit correctors 30.

The NAND gates 32 function to determine whether or not to output the current from the corresponding output units 10. Specifically, when the signal A to the NAND gates has a level H, the data in the shift registers 31a to 31n are supplied to their corresponding output transistors 11a to 11n. Since these output transistors 11a to 11n are p-channel transistors, the output transistors 11 are turned on when the output from the NAND gates 32 has a level L. The transistors 11 are turned on when both the signal A to the NAND gate 32 and the output from the shift register 31 have the level H.

According to the printing data, the output controller 40 controls the ON-state or OFF-state of the output units 10 (i.e. LEDs associated with the respective output units 10) so that the printing can be carried out as specified by the printing data. For this purpose, the flip-flops 41a to 41z store the printing data which are transferred in response to the transfer clock cck. The data in these flip-flops 41 are latched in the latches 42a to 42z in response to the clock DI. An output interval of the latches 42 is controlled by the AND gates 43a to 43z according to a strobe signal STR. In this embodiment, there are 64 output units. The outputs of the AND gates 43a to 43z are supplied to the corresponding output control inputs A of the bit correctors 30.

Figure 4:
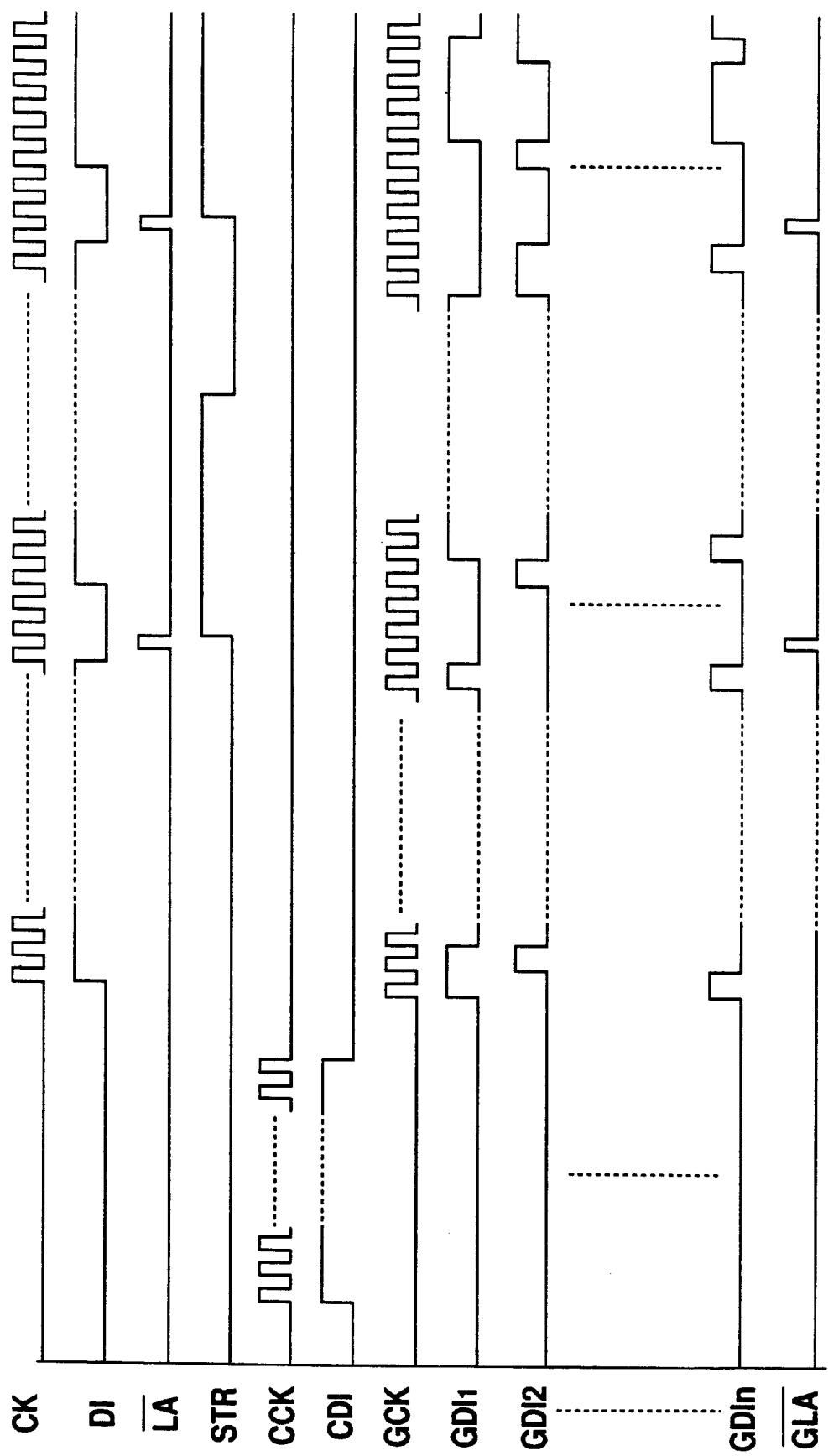
FIG. 4 is a timing chart showing the operation of the LED driving IC.

The operation of the control circuit will be described with reference to the timing chart of FIG. 4. With the activation of the power source, the correction data CDI are set in 64 n-bit shift registers 31 by the transfer clocks cck. Since the correction data CDI are serial data, they have a length of 64×n, and are transferred by 64×n clocks cck.

Thus, the correction data are set in the shift registers 31 of the output units 10. The transistors 11 of the output units 10 are turned on or off according to the correction data. The turning on or off of the transistors is performed in the entire range. The deactivated transistors re main non-operated without fail. Therefore, the output transistors 11 which are turned on are ready to output a maximum output current.

Thereafter, gradation data GD1 to GDm are transferred to the m-bit shift registers 23 in response to the transfer clock signals GCK, and are set therein. In this embodiment, the gradation data GD1 to GDm are input in parallel, and are set in 64 m-bit registers 23 by the 64 transfer clock signals GCK. Then, in response to a reverse signal TLA, the values stored in the m-bit registers 23 are latched in the m-bit latches 21. Thus, the gradation data for one printing line are set in the m-b it latches 21. The digital to analog converters 21 convert the m-bit gradation data into a voltage signal, which serves as a source voltage for the transistors 11 of the output units 10. The voltage between the drain and source terminals of the transistors 11 is adjusted to a voltage corresponding to the gradation data.

The foregoing operation is repeated for each line.

Printing data DI are input to the shift registers 41 by the clock signals CK. After transfer of the data for one line, the values stored in the shift registers 41 are latched in the latches 42 by a reverse signal LA. The AND gates 43 are opened during the high level period of the strobe signal STR, so that the AND gates 43, which correspond to the flip-flops 41 for enabling the printing, output a H-level signal to the bit correctors 30.

The outputs from the flip-flops 31a to 32n of the bit correctors 30 are supplied to the gates of the output units 10.

Then, the transistors 11 of the output units 10 are turned on, thereby providing a drive current to their corresponding LEDs.

As described so far, the correction data to the n-bit shift registers 31 of the bit correctors 30 are input when the power source of the printer is turned on. If the correction data are held by using nonvolatile memory elements, for example, it is not necessary to input the correction data each time the power source is turned on.

The input signals may be simplified by combining the signals CK and GCK and by combining the reverse signals LA and GLA (shown in FIG. 1), thereby further simplifying the ICs.

Figure 5:
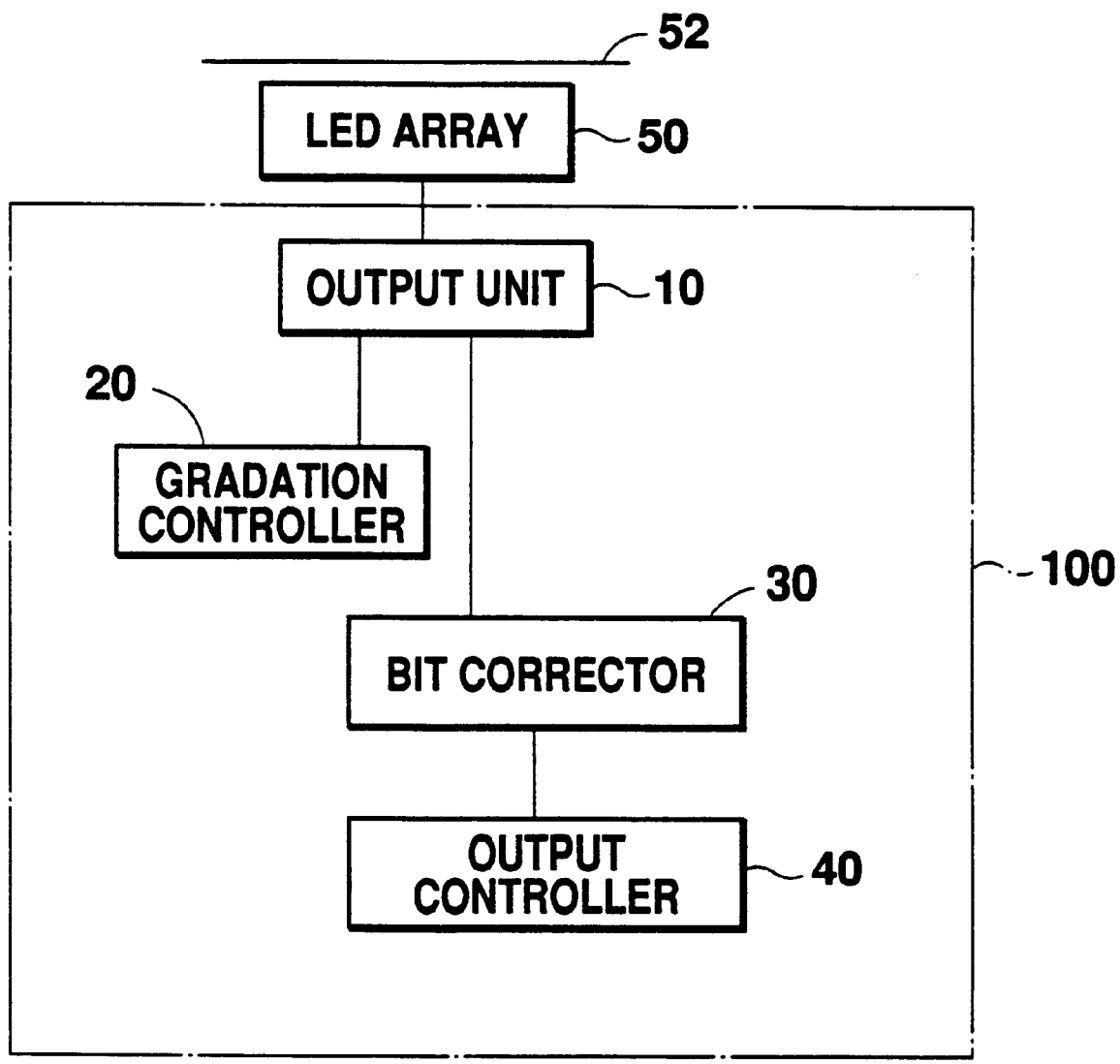
FIG. 5 is a block diagram showing an LED printer to which the LED driving IC is applied.

FIG. 5 is a block diagram showing the configuration of an LED printer to which the foregoing LED driving ICs are applied. A drive current from the LED driving IC 100 is supplied to an LED array 50, so that the LEDs (dot) emit light to carry out a printing operation on a sheet 52. The print is subject to the n-bit correction per dot according to the n-bit correction data, and the gradation is set based on the m-bit gradation data.

The circuit according to the invention is described to be applied to control the voltage for driving the LEDs. This circuit is also applicable to control other currents such as a drive current for a thermal head in a thermal printer, and so on.

According to the invention, the digital to analog converter of the gradation control circuit is designed to apply an analog voltage of $2^m$ gradations to the drain and source terminals of n output transistors. Therefore, the print data can be subject to gradation control substantially in proportion to the analog output from the digital to analog converter as specified by the gradation data. Furthermore, since the gate voltages of the output transistors are directly controlled by the output voltage of the correction circuit including CMOS, the circuits for the bit correction and gradation control can be simplified, and their cost reduced.

What is claimed is:

1. A current control circuit for controlling a current for driving a print head having a plurality of printing dots, said current control circuit comprising:

at least one set of n output transistors, each outputting a driving current, outputs of said n output transistors being connected together at a summing node, and wherein said driving current from said n output transistors is summed at said summing node to produce a driving current for one printing dot of said plurality of printing dots;

at least one n-bit register, storing n bits of correction data for the one printing dot and having n outputs connected to said n output transistors to control ON or OFF states of said n output transistors;

at least one m-bit register storing m bits of gradation data; and at least one digital/analog converter receiving said m bits of gradation data, having an output connected to sources of said n output transistors, and producing a voltage which is applied to the sources of said n output transistors in accordance with the m bits of stored gradation data, wherein the driving current for the one printing dot is controlled based on a combination of correction data and gradation data.

2. A current control circuit as in claim 1, wherein each n-bit register is connected to a gate of each of said n output transistors.

3. A current control circuit as in claim 1, wherein the digital/analog converter is connected between said m-bit register and said n output transistors for converting the stored m bits of gradation data in the m-bit register into an analog voltage, and for applying the analog voltage to said sources of said n output transistors.

4. A current control circuit as in claim 3, wherein a source potential of said n output transistors is changed by an output from the digital/analog converter.

5. A current control circuit as in claim 1, wherein:

said at least one set of n output transistors comprises a plurality of sets of n output transistors, said at least one n-bit register comprises a plurality of n-bit registers, and said at least one m-bit register comprises a plurality of m-bit registers, whereby each of a plurality of printing dots are driven by currents summed from one of said plurality of sets of output transistors.

6. A current control circuit as in claim 5, wherein said sets of n output transistors are equal in number to one of the plurality of n-bit registers and the plurality of m-bit registers.

7. A current control circuit as in claim 5, wherein the plurality of n-bit registers is connected in series to serially receive predetermined correction data.

8. A printer with a LED print head, comprising:

a plurality of sets of n output transistors, each of said sets outputting a driving current for one printing dot, said n output transistors of each of said sets of n output transistors being connected together at a summing node to produce said driving current for the one printing dot;

a plurality of n-bit registers, each of said n-bit registers storing n bits of correction data for the one printing dot and having n outputs connected to one set of said n output transistors to control ON or OFF states of said n output transistors;

a plurality of m-bit registers, each of said m-bit registers storing m bits of gradation data;

a plurality of digital/analog converters, each of said digital/analog converters receiving said m bits of gradation data, having an output connected to sources of one of said sets of n output transistors, and producing a voltage which is applied to the sources of said one of said sets of n output transistors in accordance with the m bits of stored gradation data, wherein the driving current for the one printing dot is controlled based on a combination of correction data and gradation data; and a LED array including a plurality of LEDs receiving current from the plurality of sets of n output transistors.

* * * * *